United States Patent [19]

Lafforthun

[11] Patent Number: 4,757,638
[45] Date of Patent: Jul. 19, 1988

[54] BAT ELIMINATION DEVICE

[76] Inventor: David Lafforthun, 1431 W. Galway Rd., Galway, N.Y. 12074

[21] Appl. No.: 49,398

[22] Filed: May 14, 1987

[51] Int. Cl.⁴ .............................................. E04B 1/72
[52] U.S. Cl. ...................................... 43/66; 119/15.6; 52/101
[58] Field of Search ................... 43/64, 65, 66; 119/1, 119/15.6, 19; 49/58; 52/101; 160/12–17

[56] References Cited

U.S. PATENT DOCUMENTS

| | | | |
|---|---|---|---|
| 904,090 | 11/1908 | Salokar | 160/12 |
| 1,151,041 | 8/1915 | Reefe | 43/66 |
| 1,506,045 | 8/1924 | Boyer | 43/65 |
| 1,678,178 | 7/1928 | Brophy . | |
| 3,091,221 | 5/1963 | Worm . | |
| 3,990,173 | 11/1976 | Barone . | |
| 4,669,237 | 6/1987 | Constantine | 52/101 |

FOREIGN PATENT DOCUMENTS 794114  2/1936  France .

*Primary Examiner*—Nicholas P. Godici
*Assistant Examiner*—Carmine Cuda
*Attorney, Agent, or Firm*—Heslin & Rothenberg

[57] ABSTRACT

A device and method are disclosed for use in eliminating bats from the interior of a structure. The device includes a housing having a tubular entry passage and a prism shaped exit chamber. The entry passage is mountable to a structure so as to substantially cover an opening through which bats are accessing the interior of the structure and to allow entrance to the exit chamber. The exit chamber includes a perforated door secured thereto for outward swingable movement. The door will open upon pressure from within but not without the housing.

4 Claims, 2 Drawing Sheets

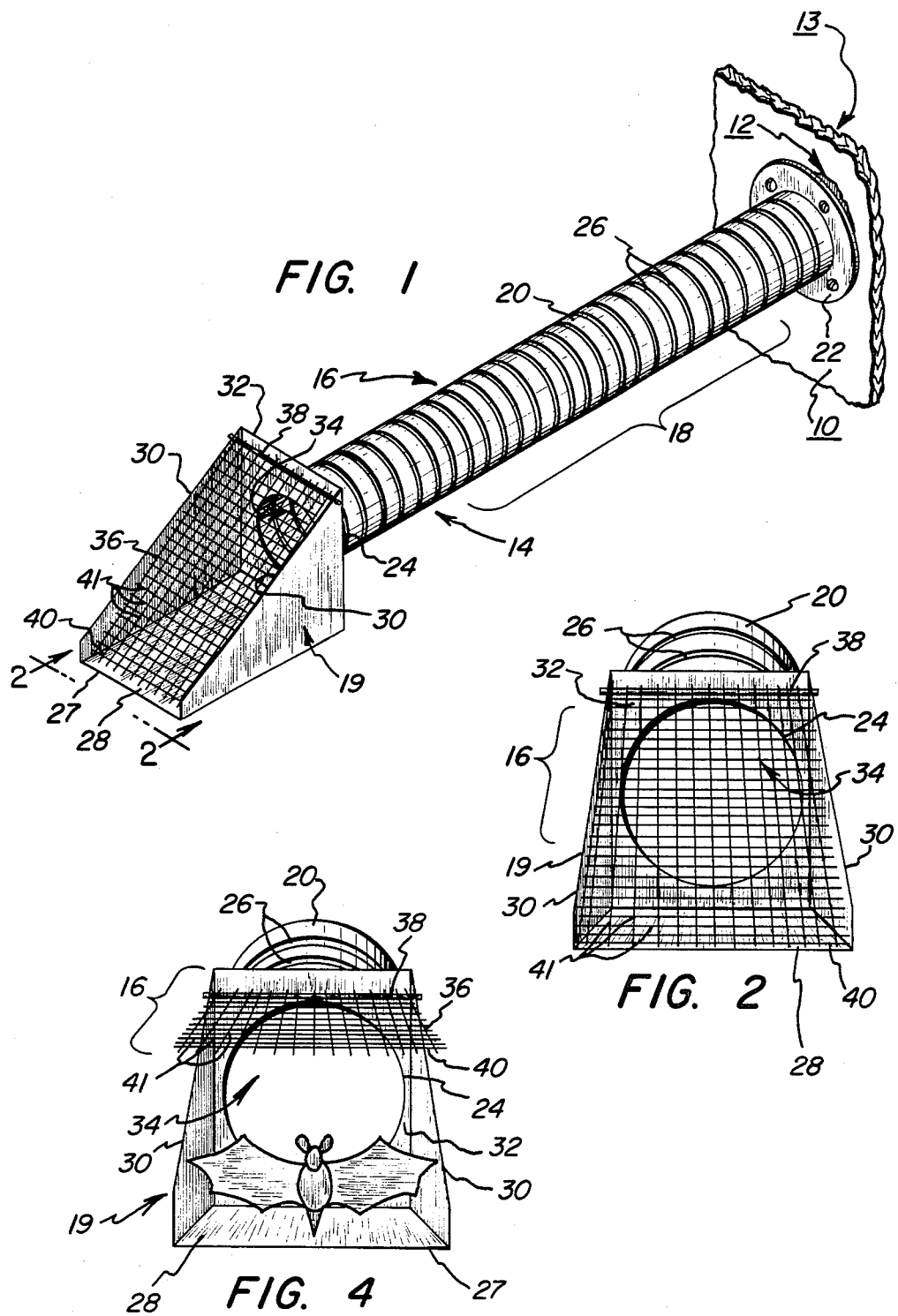

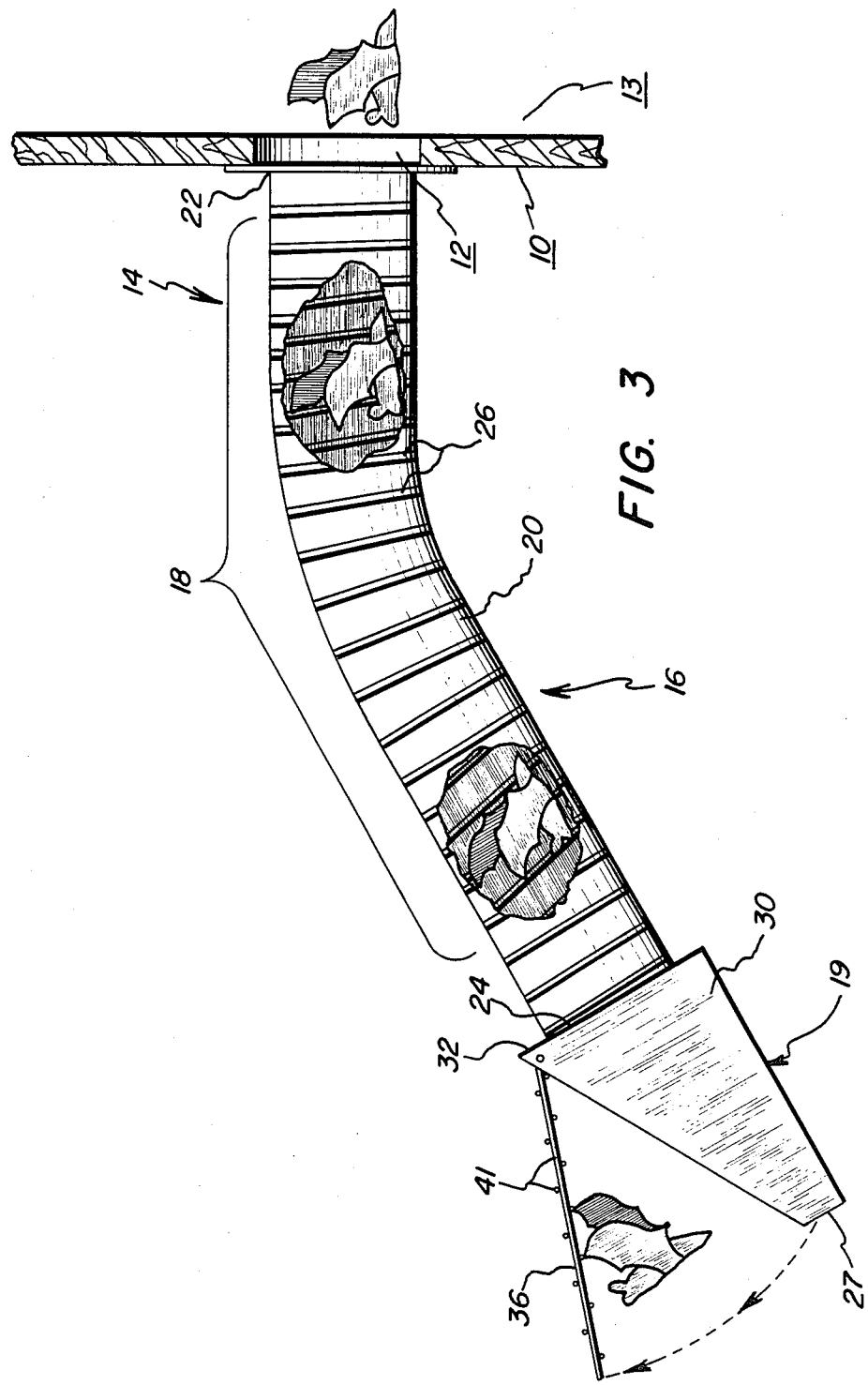

BAT ELIMINATION DEVICE

BACKGROUND OF THE INVENTION

The present invention generally relates to bat elimination devices and more specifically to a device for effecting exit of bats from the interior of a structure while preventing reentry thereto.

Of the numerous vermin taken to inhabiting buildings and other structures, few disturb homeowners as intensely as do bats. Since bats tend to live in colonies, one structure may house several hundred of them. Considering that bats are often carriers of rabies, this can present quite a substantial health hazard. Additionally, the fact that bat guano (droppings) makes excellent fertilizer is usually of little consolation to the homeowner plagued with a sizable colony in the attic. Lastly, and most importantly, of the hundreds of varieties of animals known to man, few instill as much fear in both young and old as do bats. Those time worn tales portraying bats as blood-sucking creatures fond of entangling themselves in women's hair have resulted in the use of many largely useless remedies such as moth balls and the burning of sulfur candles. In fact, some desperate individuals have resorted to the use of dangerous pesticides such as hydrogen cyanide in order to rid themselves of the pest. In recent years intricate traps have also been devised to exterminate bats within a structure (see, e.g., U.S. Pat. No. 3,990,173), however such traps tend to be inhumane, require removal of corpses following extermination and are all but useless in preventing new bats from subsequently entering and remaining within the structure. Consequently, a need continues to exist for a bat elimination device which is both safe and effective and which permanently eliminates bats from a structure while keeping new ones from inhabiting the same building.

SUMMARY OF THE INVENTION

The above described need is satisfied in accordance with the present invention by the provision of a housing having an ingress and an egress. Means are provided for securing the ingress of the housing to a structure so as to both substantially cover a structural opening through which bats enter and exit the interior of the structure and provide bat access to the housing from within the structure. A perforated door is secured to the housing so as to substantially cover the egress and permit bats exit from the housing but not entrance thereto.

Accordingly, one object of the present invention is the provision of an effective bat elimination device which operates in accordance with a bat's flying habits.

Another object of the present invention is to provide a means for bat elimination which will not only rid a structure of bats, but will prevent subsequent reentry by new bats.

A further object of the invention is the provision of a humane means and method for removing bats from a structure which is also safe, sanitary and requires little or no contact with the bats themselves.

An even further object of the invention is the provision of an inexpensive elimination device which is also easily installed, adaptable to any given structure and requires little or no maintenance.

BRIEF DESCRIPTION OF THE DRAWINGS

These and other objects, features and advantages of the invention will become more fully apparent from the following detailed description of one illustrative embodiment when read in conjunction with the accompanying drawings in which:

FIG. 1 is a perspective view of the present invention affixed to a structure over an opening through which bats enter and exit the structure.

FIG. 2 is a front view of the device from lines 2—2 of FIG. 1.

FIG. 3 is a partially cutaway, side elevational view of the device with bats exiting the structure through the device.

FIG. 4 is a front view of the device showing a bat exiting the device.

DETAILED DESCRIPTION OF THE DRAWINGS

Referring more particularly to the drawings, FIG. 1 shows the preferred embodiment of a device 14 of the present invention secured to a structure 10 so as to substantially cover an opening 12 therein through which bats enter and exit the interior 13 of structure 10. The device 14 generally includes a housing 16 having an entry passage 18 which provides an ingress to housing 16 from the interior 13 of the structure 10 and an exit chamber 19 which provides an egress from housing 16 to the outer environment. Entry passage 18 is composed of a tube 20 which is of sufficient size for a bat to fly or crawl through with relative ease, a first end 22 mountable to structure 10 so as to substantially cover structural opening 12, and a second end 24 which provides access to exit chamber 19. In the preferred embodiment, tube 20 is radially corrogated 26 thus providing flexibility to entry passage 18 such that it may be positioned at any desired angle relative to structural opening 12.

Exit chamber 19 of housing 16 comprises an exit end 27, a bottom 28, side walls 30, and a rear wall 32. As shown, second end 24 of entry passage 18 is secured to rear wall 32 of exit chamber 19 so as to provide an entranceway 34 to exit chamber 19 Additionally, side walls 30 of exit chamber 19 preferably slope downwardly relative to rear wall 32 such that exit chamber 19 forms a prism shape, thus facilitating the exit of more than one bat at the same time by allowing flight over the lowered side walls 30.

Referring now to both FIGS. 1 and 2, exit end 27 of exit chamber 19 is substantially covered by a perforated door 36 having a rear edge 38 and a frontal edge 40. Perforations 41 in door 36 allow air current to flow through device 14 thus alerting bats within the structure 10 to the continued existence of an exit passageway. As bats prefer to use familiar exit and entrance passageways, this feature corresponds to the bats' instinctive habits. In the preferred embodiment, door 36 is a screen thus allowing for maximum air flow through device 14. Also, rear edge 38 of door 36 is preferably pivotally positioned between the upper rims of side walls 30 so as to be swingably liftable and lowerable along a horizontal axis. Alternately, door 36 may be hingedly mounted to rear wall 32 so as to effect equivalent pivotal movement. Downward movement of door 36 is preferably limited by contact between frontal edge 40 of door 36 and bottom 28 of housing 16 such that door 36 is only capable of opening outwardly Door 36 is opened when pressure is exerted thereon from within housing 16. Additionally, bottom 28 is preferably smooth and sloped downwardly to exit end 27, when device 14 is positioned as discussed above, so as to facilitate forward movement of a bat exiting through exit chamber 19 and substantially reduce the ability of the bat to stop within housing 16 and retreat back to structure 10 through entry passage 18.

Referring now to FIGS. 3 and 4, device 14 is shown in operation. Bats leaving structure 10 to feed will be alerted to the continued existence of an exitway by the constant air current maintained by perforations 41 in door 36. As shown in FIG. 3, the bat may then enter device 14 through first end 22 of entry passage 18. Tube 20 of entry passage 18 is preferably flexed downwardly such that, as the bat flies through tube 20 it will acquire increased forward momentum. As illustrated in FIG. 4, upon entering exit chamber 19, the bat's body will contact door 36, causing door 36 to pivot upwardly thus facilitating departure from exit chamber 19 at exit end 27. Both increased momentum and lack of friction due to the smoothness of bottom 28 of exit chamber 19 greatly reduce the ability of the bat to stop forward movement prior to contacting door 36. However, should the bat manage to stop within exit chamber 19, the smooth, downwardly sloping bottom 28 will tend to cause the bat to slide by gravity toward exit end 27 thus effecting desired contact with door 36. Additionally, as noted above, simultaneous exit by a number of bats is facilitated by the downwardly sloping side walls 30 of exit chamber 19 which allow bats to exit from the sides as well as the front of the raised door 36.

Once a bat has exited device 14, door 36 will preferably pivot by gravity back to its lowered, closed position with its frontal edge 40 resting against bottom 28 and its sides adjacent side walls 30. Alternatively, door 36 may be spring biased so as to snap back into its closed position subsequent to exit by a bat. In either embodiment door 36 will not open upon pressure from outside housing 16 and, therefore, the bat will be unable to gain access back into housing 16 once door 36 has been shut. In this way, all bats inhabiting structure 10 will either die within it from lack of food or will, more likely, exit through device 14. Once all bats have left structure 10, device 14 may be removed from structural opening 12 and opening 12 may be permanently sealed.

While the invention has been particularly shown and described with reference to a preferred embodiment thereof, it will be understood by those skilled in the art that various other changes in form and details may be made therein without departing from the spirit and scope of the invention.

I claim:

1. A device for eliminating bats from the interior of a structure having a structural opening through which said bats enter and exit said interior, said device comprising:
    a housing having a tubular-shaped entry passage and a prism-shaped exit chamber;
    said entry passage being radially corrugated and having a first end and a second end, said first end being mountable to said structure such that it substantially covers said structural opening and allows said bats occupying the interior of said structure to enter said housing, and said second end of said entry passage being secured to said exit chamber and providing entry to said exit chamber; and
    said exit chamber having a screen door pivotally secured thereto, said door pivoting in and outward direction when pressure is applied thereto from within the housing, said screen allowing airflow through the housing to identify for said bats the housing as an exit from said interior, said prism shape of said chamber facilitating exit of bats from said housing, whereby said radial corrugations of said entry passage allow the elimination device to be positioned over a structural opening of any orientation with said prism-shaped exit chamber depending downwardly.

2. The device of claim 1 further comprising a mounting flange secured to said first end of said radially corrugated entry passage, said mounting flange having a substantially flat base surface for engaging said structure adjacent said structural opening.

3. The device of claim 1, wherein said mounting flange is unitary with said first of said radially corrugated entry passage.

4. The device of claim 1, wherein said exit chamber of said housing includes a bottom having a smooth interior surface such that when said housing is positioned with said exit chamber depending downwardly, bats within said exit chamber will tend to gravitationally slide toward said door and out of said housing.

* * * * *

UNITED STATES PATENT AND TRADEMARK OFFICE
CERTIFICATE OF CORRECTION

PATENT NO. : 4,757,638

DATED : 7/19/88

INVENTOR(S) : Lafforthun, David

It is certified that error appears in the above-identified patent and that said Letters Patent is hereby corrected as shown below:

Claim 1, line 20, "and" should read "an"

Claim 3, line 36, "1" should read "2"

Claim 3, line 37, "first" should read "first end"

Claim 4, line 39, "1" should read "3"

Signed and Sealed this

Thirteenth Day of December, 1988

Attest:

DONALD J. QUIGG

Attesting Officer      Commissioner of Patents and Trademarks